United States Patent [19]

Edwards

[11] 4,038,871
[45] Aug. 2, 1977

[54] LIQUID LEVEL GAUGE

[75] Inventor: Harrison F. Edwards, Norwich, N.Y.

[73] Assignee: Liquidometer Corporation, Norwich, N.Y.

[21] Appl. No.: 629,653

[22] Filed: Nov. 6, 1975

[51] Int. Cl.² .................................................. G01F 23/00
[52] U.S. Cl. .................................. 73/304 C; 324/61 P
[58] Field of Search .......................... 73/304 C, 304 R; 317/246; 324/61 P

[56] References Cited

U.S. PATENT DOCUMENTS

| 2,138,677 | 11/1938 | Meyer | 73/304 R X |
|---|---|---|---|
| 2,356,593 | 8/1944 | Koeppe et al. | 73/304 R |
| 2,428,700 | 10/1947 | Eilenberger | 324/61 P X |
| 2,622,442 | 12/1952 | DeBoisblanc et al. | 324/61 P X |
| 2,797,284 | 6/1957 | Brooke | 73/304 R X |
| 3,103,815 | 9/1963 | Gardner | 73/304 C |
| 3,260,883 | 7/1966 | Martin | 317/246 X |
| 3,553,575 | 1/1971 | Shea | 324/61 P |
| 3,774,237 | 11/1973 | Hardway, Jr. | 324/61 R |
| 3,916,689 | 11/1975 | Donnelly | 73/304 C |
| 3,935,739 | 2/1976 | Ells | 73/304 C |

Primary Examiner—Richard C. Queisser
Assistant Examiner—John S. Appleman
Attorney, Agent, or Firm—H. Gibner Lehmann; K. Gibner Lehmann

[57] ABSTRACT

A gauge for monitoring the height of liquid contained in a storage tank or the like, comprising a channel-like structure having a first elongate probe element constituted as a circuit board having a conductive strip running for a substantial length therealong, an additional upright probe element also constituted as a circuit board, coextensive with the first and also having a conductive strip running for a substantial length therealong, and an elongate member disposed along the boards and constituting a spacer for maintaining the conductive strips of each of the elements in substantially parallel relation. Means are provided for mechanically connecting the boards to the spacer, with both probe elements being adapted for immersion in the liquid being gauged. In addition, means are provided for impressing a voltage on the conductive strip of one probe element, and additional means for detecting voltage induced or sensed on the conductive strip of the other probe element, the latter voltage being a function of the immersion of the elements in the liquid being gauged. By the invention there is no dielectric material in the area between the conductive strips. Accordingly, the likelihood of debris and residue in the tank bridging the gap between the strips is greatly minimized, since there is complete access of the fluid to those portions of each board which carry the strips. Improved performance and accuracy over extended periods of use thereby result.

16 Claims, 18 Drawing Figures

Fig. 11

LIQUID LEVEL GAUGE

BACKGROUND

This invention relates generally to liquid level gauging systems, and more particularly to systems wherein a voltage is applied to one of two conducting probes, with a corresponding potential being experienced by the other probe, such potential being influenced by the immersion of the probes in the liquid being gauged.

In the past, a number of such liquid level gauges have been proposed and produced. Most prior units employed probes consisting of two concentrically mounted conductive tubes which were mechanically secured and electrically insulated from one another by means of insulating spacers. Voltage was generally applied to the outer tube, with the inner tube being connected to a detector which sensed the potential assumed by it.

While such systems functioned quite well immediately after installation, there tended to be a gradual build up of debris, oil film, and other foreign material on the spacer members disposed between the tubes, especially after prolonged periods of use. This especially occurred where the spacing between the tubes was quite small, and where the spacers which were used were disposed in positions transverse to the flow of the liquid being gauged (such flow being in a direction parallel to the axes of the tubes and occurring in the space therebetween). In the event that the debris had conductive or dielectric characteristics which were somewhat different from that of the liquid being gauged, there would be introduced substantial errors in the readings by virtue of the short-circuiting effect of the debris on the electrodes. In addition, due to the fact that the flow between the conductive tubes was rather restricted, the likelihood of such debris being flushed out periodically was extremely remote. Accordingly, after a period of use it was usually necessary to remove the probe unit and forcibly flush out any foreign material which had become lodged between its electrodes.

Concentric-tube probe devices were generally open only at the bottom, and thus did not permit free flowing of the liquid being gauged into the space between the tubes. Such circumstances tended to introduce errors into the readings, since the nature of the liquid occupying the space between the electrodes at any particular time was not necessarily similar to that of the liquid occupying the remainder of the tank.

In prior devices employing spaced-apart metal electrodes or rods where there were insulating spacers or washers, a build-up of debris and other foreign matter associated with oil storage facilities occurred. Parallel electrodes without such spacers were fragile, and the spacing between the electrodes tended to change. In addition, many prior liquid gauges were expensive to produce in that they required complex assembly operations and adherence to close physical tolerances. For example, in the concentric-tube type of probe device, the spacing between the tubes had to be maintained to a close tolerance, which meant that multiple spacers were required. The time involved with producing such probes was frequently rather high, resulting in a product which was expensive to both produce and maintain.

SUMMARY

The above drawbacks and disadvantages of prior liquid level gauging systems are obviated by the present invention, which has for an object the provision of a novel and improved liquid gauge which is not only extremely simple in construction, but also especially reliable in its operation and accuracy, particularly over extended periods of time. A related object is the provision of a device which can be mass-produced in large quantities, and wherein the assembly time required is low. Readily available materials are used throughout, with an absolute minimum number of separate pieces being required.

A further object of the invention is the provision of a liquid gauge as above, wherein the maintenance is reduced to an absolute minimum, or even eliminated. As a result, the "down" time of the gauge is very low.

Still another object of the invention is the provision of a liquid level gauge as characterized, wherein the conductive portions of the immersed electrodes are continuously and freely exposed to the liquid in the tank, such that the unit is both free-flooding and free-flushing. As a result, the build-up of residue and other foreign matter on the critical portions of the electrodes is greatly minimized.

The above objects are accomplished by a liquid level gauge comprising an upright probe element adapted for immersion in the liquid, the probe being constituted as an elongate circuit board having a conductive strip presenting a flat, exposed area and running for a substantial length along the board, an additional upright probe element also constituted as a circuit board and having a conductive strip presenting a flat, exposed area, the second board being coextensive with the first, together with an elongate member or rod constituting a spacer interposed between the boards for maintaining the conductive strips thereof in substantially parallel relation. Means are provided for mechanically connecting the probes to the spacer, thus forming a pair of back-to-back channels having the cross-sectional configuration of the letter H. A voltage is applied to one of the conductive strips, and means are provided for detecting the potential sensed by the other of the conductive strips, such potential being influenced by the immersion of the probes in the liquid being gauged. The construction is extremely simple, and has been found to be very reliable over extended periods of use. The provision of a free-flooding and free-flushing configuration greatly minimizes errors which would otherwise normally be introduced into the gauge by virtue of build-up of foreign material between the active parts thereof. Because the single spacer member between the boards has no upwardly facing surfaces which are submerged, there is minimized the possibility of debris becoming suspended in the openings of the channel in which the conductive strips are disposed. As a result, maintenance of the gauge is virtually eliminated.

Other features and advantages will hereinafter appear.

In the drawings, illustrating several embodiments of the invention.

Figures 1, 2, 3, 4, 5, 6, 7, 8, 9:
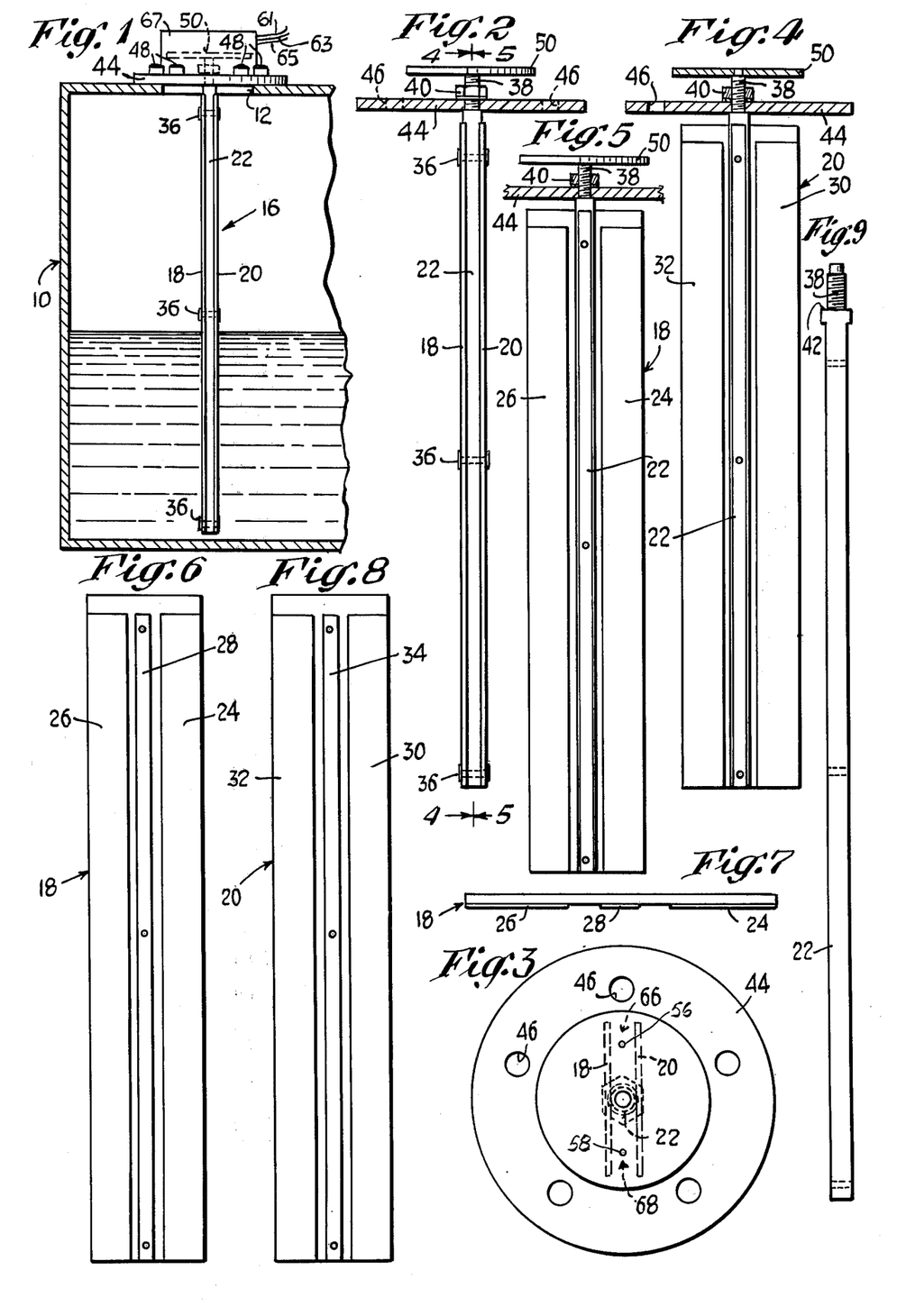
FIG. 1 is a vertical sectional view of an oil storage tank, showing a probe unit constructed in accordance with the present invention.
FIG. 2 is an enlarged front elevational view of the tank unit of FIG. 1.
FIG. 3 is a top plan view of the tank unit shown in FIGS. 1 and 2.
FIG. 4 is a vertical section taken on line 4—4 of FIG. 2.
FIG. 5 is a vertical section taken on line 5—5 of FIG. 2.
FIG. 6 is a front elevational view of one of the probe elements, constituted as an elongate printed circuit board, the board being employed in the tank unit illustrated in FIGS. 1-5.
FIG. 7 is a top plan view of the printed circuit board of FIG. 6.
FIG. 8 is a front elevational view of the other of the probe elements of the tank unit shown in FIGS. 1-5, this probe being also constituted as a printed circuit board and having a configuration substantially the same as that illustrated in FIG. 6.
FIG. 9 is a front elevational view of a support rod constituting a spacer member for maintaining the printed circuit boards of the tank unit in spaced relation to one another.

Referring first to FIG. 1, there is illustrated a storage tank for oil, gasoline, etc. generally designated by the numeral 10, having an aperture or opening 12 at the top, and shown as being partially filled with liquid. In accordance with the present invention, there is provided a tank immersion or probe unit generally designated by the numeral 16, comprising a pair of upright probe elements 18 and 20, respectively, each of the elements being constituted as a printed circuit board. The elements 18, 20 are elongate and coextensive with one another, and have an elongate spacer rod 22 interposed therebetween. In the present instance, the rod is constituted of fiberglass, or can be made of other insulating material.

Referring for the moment to FIGS. 6 and 8, the probe elements 18, 20 are illustrated in detail. In FIG. 6, the probe element 18 has a conductive strip 24 extending on one side of the board along a longitudinal edge portion thereof. Carried at the opposite longitudinal edge of the board is a second conductive strip 26. In addition, disposed between the conductive strips 24, 26 is a third conductive strip, indicated by the numeral 28 in FIG. 6. Referring to FIG. 8, the probe 20 has a first conductive strip 30 extending along one longitudinal edge, a second conductive strip 32 extending along the opposite longitudinal edge, and an additional conductive strip 34 interposed between the two strips 30, 32.

FIG. 2 shows the tank immersion or probe unit on a somewhat larger scale. The printed circuit board 18, together with the printed circuit board 20, is secured to the spacer member 22 by means of a plurality of rivets 36, which extend completely through aligned apertures in the boards 18, 20 and the member 22. The circuit boards 18, 20 are mounted with their conductive strips facing one another. By such an arrangement, the conductive strip 26 is disposed opposite the conductive strip 30, the same being true of the conductive strips 24 and 32. In addition, the conductive strips 28 and 34 are opposite one another and engage the spacer member 22 along its opposite edges. The conductive strips 24, 26, 30 and 32 are seen to be flat, as illustrated in FIGS. 2-8, presenting flat, exposed surfaces which can be engaged by the liquid in the tank 10.

Figure 10:
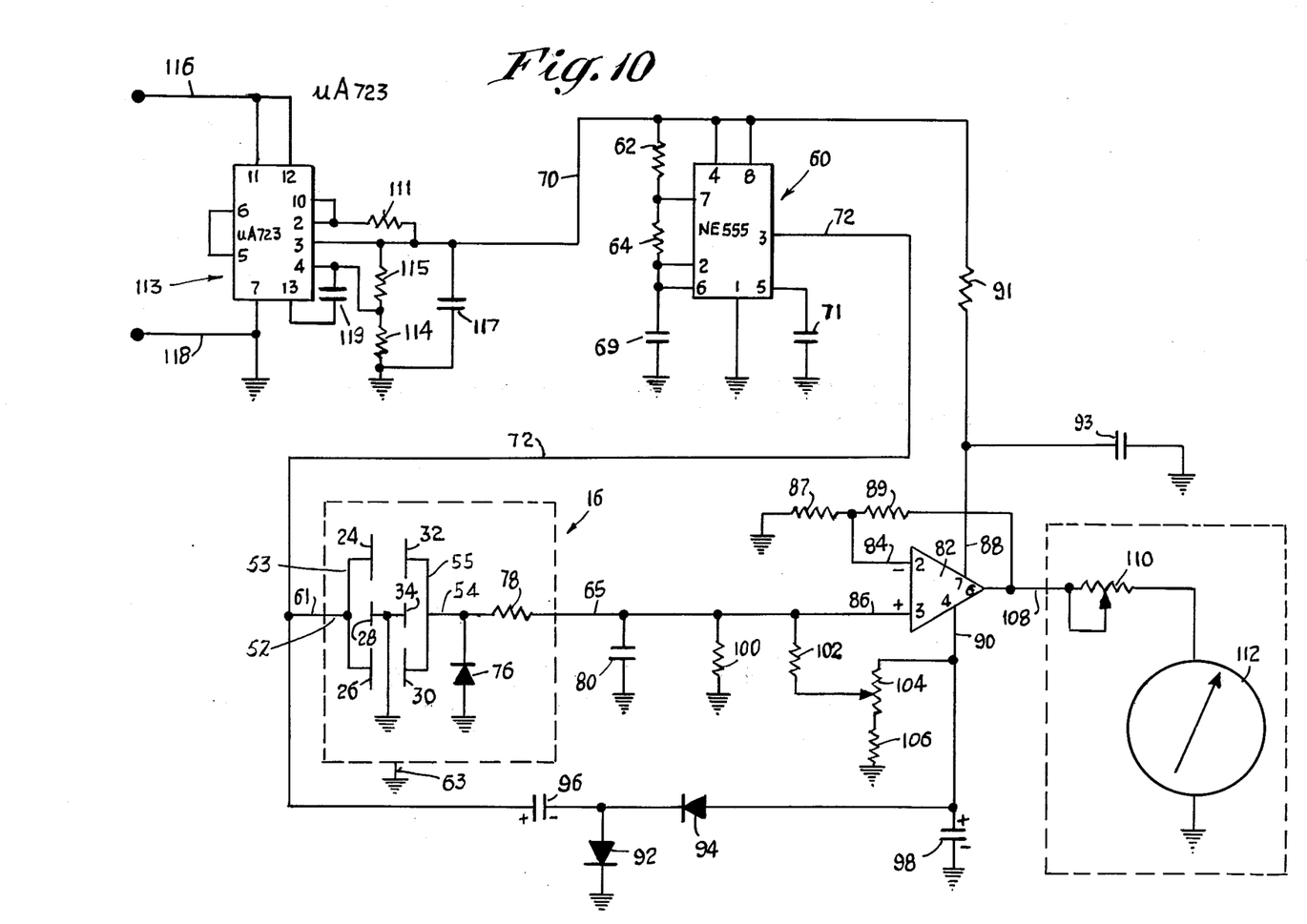
FIG. 10 is a schematic circuit diagram of the tank unit of the present invention, and including a typical circuit arrangement wherein a voltage is applied to the conductive strip of one of the probe elements, and potential sensed from the other of the probe elements, in order to provide readings of the liquid level in the tank.

Referring again to FIGS. 2, 4 and 9, the upper end of the spacer member 22 is preferably threaded at 38 and carries a nut 40. A shoulder 42 on the member 22 is adapted to be engaged by an abutment plate 44 having a plurality of apertures 46 which receive mounting screws 48 for attachment to the tank 10. The tip of the spacer member 22 carries a small printed circuit board 50 from which several leads extend, for connection to the conductive strips 24, 26 and 30, 32. These leads have been omitted from FIGS. 1, 2 and 4 in the interest of clarity, but are shown in FIG. 10 and indicated by the numerals 52 and 54, respectively extending through small holes 56, 58 in the plate 46. In addition, multiple leads 61, 63, 65 are shown extending away from the circuit board 50, for connection to amplifier and indicator circuitry located externally of the tank 10, as shown in FIG. 10.

By the above arrangement, it is seen that there is no dielectric material interposed in the path between the conductive strip 24 and the strip 32, the same being true of the conductive strip 26 with respect to the strip 30. As a result, it has been found that there is greatly minimized undesirable build-up of debris and other foreign material in the area between the strips. As particularly illustrated in FIG. 3, the two circuit boards 18, 20, together with the spacer member 22, have a cross-sectional configuration similar to the letter H and form a pair of back-to-back U-shaped channels 66, 68. The latter have open portions which are continuously exposed to the liquid in the tank, thus providing a free-flooding, free-flushing construction wherein the active surfaces, constituted as the conductive strips, are constantly in contact with liquid samples which are truly representative of the remaining liquid which is contained in the tank. Clearly, such was not the case with prior gauges wherein concentric-tube type probes were employed. In addition, by virtue of the relatively large openings formed by the U-shaped channels 66, 68, there is minimized the likelihood of debris becoming lodged within the channels and thus "short-circuiting" the conductive strips 26, 30, or strips 24, 32. In addition, as shown in FIG. 1 the tank unit 16 is readily removable from the tank in the event that any servicing or maintenance is required, this being accomplished by simply removing the screws carried by the mounting plate 44, and lifting the tank unit through the opening 12. As a result, maintenance is simplified, with the down time of the unit being substantially reduced.

Also in accordance with the present invention, means are provided for applying a voltage to one of the conductive strips 24 on the probe element 18, and for detecting potential sensed by the conductive strip 32 on the other probe element 20. FIG. 10 shows a typical schematic circuit diagram of a voltage applying means, together with a detector for enabling readings of the level to be obtained. In the present instance, the conductive strips 24 and 26 are shown in FIG. 10 as being connected in parallel with one another through a suitable jumper wire 53 on the element 18. Similarly, the conductive strips 30 and 32 are also shown in FIG. 10 as being connected in parallel by a second jumper 55 on the element 20. These jumpers have been omitted from FIGS. 1-5 in the interest of clarity. The center strips 28, 34 can be connected together and grounded but this is not necessary for operation of this embodiment. While the above arrangement has been found to be satisfactory, the invention is not intended to be limited to the connection of multiple conductive strips in parallel. The multiple connection is intended merely to increase the active areas of the probe elements, in order to provide slightly increased drive signals to the detector. In FIG. 10 the tank unit is shown in dotted lines indicated by the numeral 16, and includes the probe elements 18, 20, the spacer 22 and plate 44.

Referring again to FIG. 10, a free-running multivibrator 60 is illustrated, which may be of the type known by the commercial designation NE555 manufactured by National Semi-conductor, or other manufacturers. The pin numbers illustrated on the schematic diagram correspond to this unit. Associated with the multivibrator 60 are frequency determining components comprising resistors 62, 64, and capacitor 69. Also, terminals 4 and 8 are connected to a line 70 carrying a positive, regulated d.c. voltage. This is obtained from a regulator circuit to be described below.

Connected to the output lead 72 of the multivibrator 60 is a line 61 which extends to the parallel connection of the conductive strips 24, 26. This output line 61 carries a square wave in the range of 10kHz to 100kHz, typically, but other frequencies will also provide satisfactory performance. Generally, the frequency is chosen to suit the geometry and spacing of the probe elements constituting the tank probe unit 16.

Referring again to FIG. 10, the conductive strips 30, 32 of the tank unit 16 are connected to a rectifier and filter circuit, comprising the diode 76, resistor 78, and capacitor 80. The leads from the strips 30, 32 to the diode 76 and resistor 78 should be physically short, since these are high impedance. In accomplishing this, the diode 76 and resistor 78 are mounted on the board 50, and the latter completely encapsulated in a resin block 67. The block provides effective resistance against moisture, dirt, etc. The output of the rectifier and filter circuit is fed to one input 86 of an amplifier 82, having a second input lead 84 connected to resistors 87 and 89. The amplifier 82 has a positive supply lead 88 extending to the regulated bus 70 (through a filtering network including resistor 91 and capacitor 93), and a negative supply lead 90 extending to a negative source of d.c. voltage obtained from a doubler circuit connected to the output line 72 of the free-running multivibrator. The doubler circuit comprises diodes 92, 94 and capacitors 96, 98. The input lead 86 of the amplifier 82 has biasing resistors 100, 102, 104 and 106 which enable adjustment of its operating point. Connected to the output 108 of the amplifier is a variable resistor 110, which in turn extends to a meter 112. The latter can be calibrated in any convenient units corresponding to the various levels of liquid to be measured.

Positive regulated voltage is obtained from an integrated circuit voltage regulator generally designated by the numeral 113, which for example can be a unit having the commercial designation uA723 manufactured by Fairchild Semi-conductor or others. Unregulated voltage is applied to terminals 116 and 118, and various components 111, 114, 115, 117 and 119 are associated with the regulator. Since the regulator per se forms no part of the present invention, it will not be described further.

The operation of the improved liquid level gauge of the present invention can now be readily understood. With power applied to the unit, a square wave output will be generated on line 72 and will consequently be applied through line 61 to the parallel-connected conductive strips 24, 26. In addition, this square wave is used to energize the voltage doubler circuit consisting of diodes 92, 94 and capacitors 96, 98 for providing a negative voltage to terminal 90 of the amplifier 82. Assuming for the moment that the tank is empty, a predetermined a.c. potential will be sensed by the conductive strips 30, 32 which are connected in parallel. This predetermined a.c. voltage will be rectified by means of the network comprising diode 76, resistor 78, and capacitor 80, and fed to the input 86 of the amplifier 82. The resistor 104 may be adjusted for the empty condition of the tank to provide a zero or other predetermined reading on the meter 112. Assuming now that the tank begins to fill with liquid, the magnitude of the signal or potential sensed by the conductive strips 30, 32 will increase, resulting in a corresponding increase in the magnitude of the d.c. voltage applied to terminal 86 of the amplifier 82. This in turn results in a corresponding increase in the d.c. level at the output of the amplifier 82, thus driving the meter 112 upscale. It will be readily understood that as the level of liquid in the tank increases, the reading on the meter 112 will increase by proportional amounts. Under the condition that the tank is completely full, the resistor 110 can be adjusted to provide a full-scale or other convenient fractional scale reading on the meter 112. As pointed out above, the meter 112 can be calibrated in any convenient units such as feet, meters, etc. to provide a desired reading of the level contained in the tank.

The above system is seen to be simple in its construction and employs readily available components. The voltage-providing and indicator circuitry can be conveniently located remotely from the tank unit 16. In addition, the meter 112 can be conveniently located at a third remote location, if this is desired.

While the tank unit 16 is shown as being employed with a source of a.c. voltage (the multivibrator 60), it could just as easily be used with equipment which applied a d.c. voltage to the electrodes 24, 26, with the strips 30, 32 being connected to suitable circuitry (not shown) adapted to detect changes in d.c. potentials assumed by these strips.

By virtue of the unique arrangement wherein U-shaped channels 66, 68 (FIG. 3) are provided, the likelihood of debris becoming lodged between the conductive strips 24, 32, or 26, 30 is greatly minimized, since within the channels, there are no spacers having upwardly facing surfaces on which foreign matter could be suspended. Moreover, each time the liquid level in the tank rises or falls, or changes character somewhat, the large openings provided by the U-shaped channels 66, 68 insure that the liquid occupying the latter is truly representative of the remaining liquid in the tank. Accordingly, the above arrangement has been found to be especially reliable and maintenance free, particularly over extended periods of use.

Figure 11:
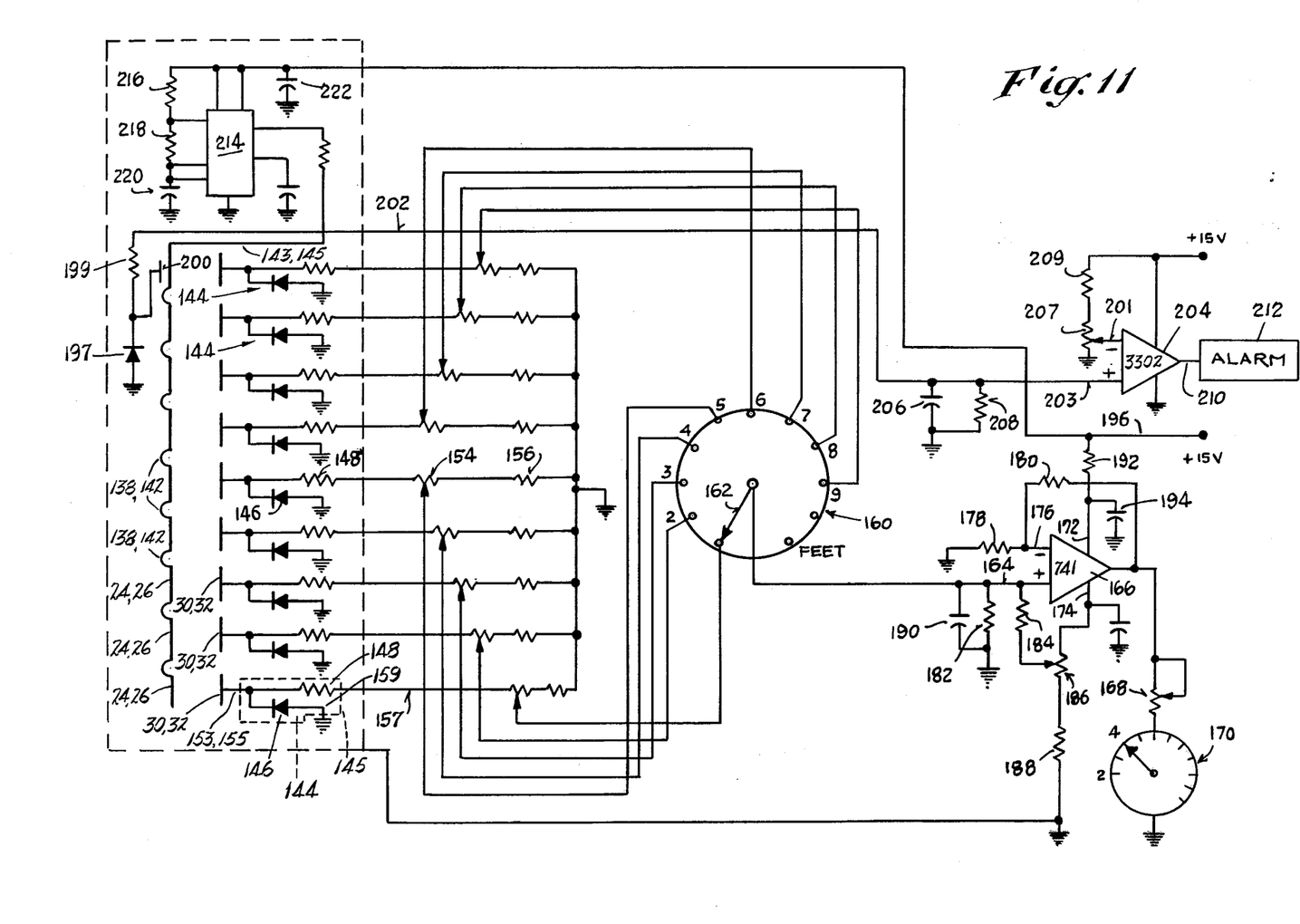
FIG. 11 is a schematic circuit diagram of another embodiment of the invention, showing an installation employing multiple probe units disposed one above the other vertically in a tank, for providing both a course digital reading and a finer resolution analog reading of the liquid level in the tank.
Figure 12:
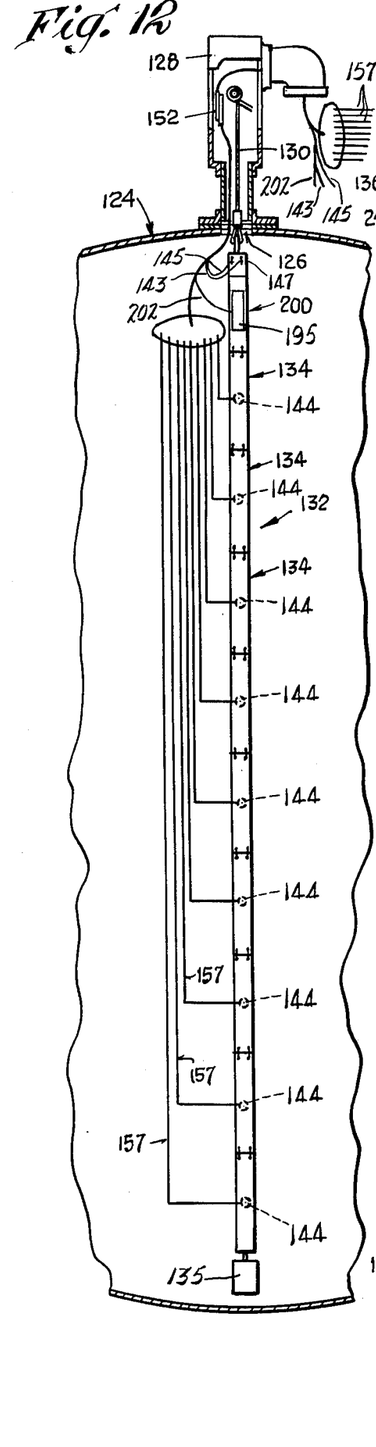
FIG. 12 is a front elevational view of the installation which is diagrammatically illustrated in FIG. 11, showing a total of ten probe units disposed one above the other.
Figures 13, 14, 15, 16, 17, 18:
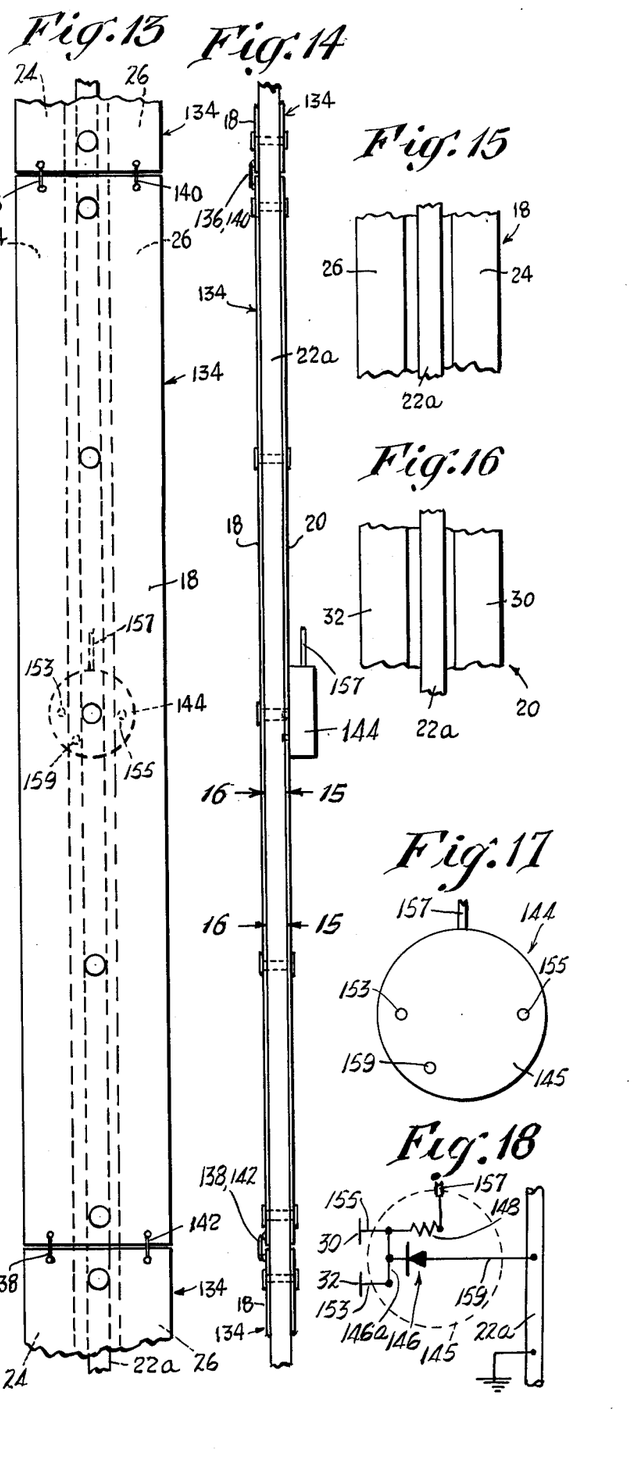
FIG. 13 is an enlarged fragmentary view of a portion of the tank unit of FIG. 12.
FIG. 14 is a side elevational view of that portion of the tank unit shown in FIG. 13.
FIG. 15 is a section taken on line 15—15 of FIG. 14.
FIG. 16 is a section taken on line 16—16 of FIG. 14.
FIG. 17 is a rear elevational view of a sealed rectifier network employed in the probe units shown in FIGS. 12-14.
FIG. 18 is a showing, partly schematic and partly diagrammatic, of the rectifier network of FIG. 17.

Another embodiment of the invention is illustrated in FIGS. 11-18, showing a modified liquid level gauge for an oil storage tank or the like. FIG. 12 shows a tank 124 having a top opening 126 on which there is mounted an entrance ell 128. Suspended from a cable 130 is a tank unit 132 comprising a plurality of probe units somewhat similar to the probe unit 16 of the first embodiment. The units are designated by the numeral 134 and are substantially identical to one another and disposed in vertical alignment. In accomplishing this, the lowermost probe unit 134 carries a stabilizing weight 135. Referring particularly to FIGS. 13 and 14 it can be seen that each unit 134 includes a pair of electrically conducting elements or probe elements 18, 20, separated by an aluminum spacer rod 22a. The latter extends substantially the full length of the tank unit, with the boards or elements 18, 20 of each probe unit 134 being riveted to the rod 22a as shown. FIGS. 13 and 14 show one complete unit 134, and a portion of the two similar units 134, one unit being immediately above, the other unit being below.

FIG. 15 illustrates the conductive strips 24, 26 of the board 18. The strip 24 of the board 18 in FIG. 15 is connected to the strips 24 of the boards immediately above and below by short jumper wires 136, 138 respectively. Similarly, the strip 26 of the board 18 is connected to the strips 26 of the boards immediately above and below by short jumper wires 140, 142, respectively. The arrangement is such that all the conductive strips 24, 26 of the boards 18 are connected together and adapted to be driven by a source of a.c. voltage to be described below. The connection to the strips 24, 26 is made by means of leads 143, 145 which extend to terminals 147 on the uppermost part of the tank unit 132 (FIG. 12).

Referring to FIG. 14, each of the boards 20 has mounted on its exterior an epoxy package 144 which has a cylindrical casing 145 and contains a rectifier 146 and resistor 148. These components are shown schematically in FIGS. 11 and 18. The package contains conductors or terminals 153, 155, 157, 159, three of which are inserted into the board 20. The terminals 153, 155 are internally connected by a jumper 146a contained within the package, and are inserted through the board 20 and soldered to the strips 32, 30 respectively to thereby electrically connect them together and form a common conductor. These are in turn connected to the cathode of each rectifier 146, respectively. The anode of the latter is connected to ground through terminal 159 which extends through the board 20 and is soldered to the centrally disposed conductive strip 34 (see FIG. 8), this engaging the grounded rod 22a. The support rod 22a can be constituted of either aluminum or stainless steel. A lead 157 extends from each of the packages, for connection to the amplifier and switching circuitry which is external of the tanks, as shown in FIG. 11.

Referring now to FIGS. 11 and 12, the leads 157 extend upwardly alongside the probe units 134, through the ell 128, and to a series of voltage dividers comprising potentiometers 154 and fixed resistors 156. The wipers of the potentiometers extend to the terminals of a selector switch 160, having a wiper 162 connected to the non-inverting input 164 of an amplifier 166. For convenience, the terminals of switch 160 have been numbered 1-9, and correspond to nine switch positions.

Connected to the output of the amplifier 166 is a variable resistor 168 which extends to a meter 170. The amplifier 166 includes positive and negative supply leads 172, 174, respectively. A resistor 178 extends from an inverting input 176 to ground. Negative feedback is provided by resistor 180. Connected to the non-inverting input 164 are biasing resistors 182, 184, 186 and 188. A capacitor 190 filters the pulsating d.c. level which appears on lines 157 (through the switch 160). A source of plus 15 volts is provided on line 196, and the plus supply for amplifier 166 is de-coupled by the resistor 192 and capacitor 194.

Referring again to FIGS. 11 and 12, an additional probe 200 is provided adjacent the upper portion of the tank, for sensing a full condition thereof. This is useful for activating an alarm, in order to prevent overflow. This probe unit is similar in construction to the units 134, including a sealed package 195 containing a rectifier 197 and resistor 199. The output lead 202 extends to a second amplifier 204. A capacitor 206 and resistor 208 connected at the non-inverting input 203 provide filtering for the pulsating d.c. on line 202. The other input 201 of the amplfier 204 receives bias from a voltage divider consisting of potentiometer 207, and fixed resistor 209. The output 210 of the amplifier can be used to drive suitable alarm circuitry, such as a buzzer or signal light (not shown).

A source of a.c. signals, comprising a multivibrator 214, is provided, for applying a square wave to the conductive strips 24, 26 of each of the boards 18 of the stacked probe units 134 shown in FIG. 12. Associated with the multivibrator 214 are frequency determining components 216, 218 and 220, as well as a filter capacitor 222.

The operation of the embodiment of the invention may now be readily understood by referring to FIGS. 11, 15 and 16. Assuming that the multivibrator 214 is energized, an a.c. signal will be applied simultaneously to the (electrically common) conductive strips 24, 26 of the nine boards 18. Assuming for the moment that the tank is empty, a portion of this signal will be capacitively coupled to the conductive strips 30, 32 on the nine boards 20. This signal will in turn be rectified by the diodes 146 and applied through the petentiometers 154 to the terminals 1-9 respectively of the switch 160. For an empty condition of the tank, the magnitude of the signal received on line 164 will be low, regardless of the setting of the switch 160. This in turn will result in a low or zero reading on the meter 170, assuming that the potentiometer 186 has been adjusted to yield such a low level reading for an empty condition of the tank. Assuming now that the level of oil in the tank rises so as to completely submerge the three lowermost probe units 134, the increased dielectric constant will give rise to larger coupled a.c. signals on the three lower lines 157. This will be reflected by an upscale reading on the meter 170 whenever the switch 160 is in any of the first three counterclockwise positions. Movement of the switch to the fourth position, however, will result in a decrease in the reading of meter 170, since the probe unit which is fourth from the bottom of the tank is not submerged. In this way, the operator will be able to obtain a rough indication of the level of liquid in the tank by merely sweeping the switch 160 through its range and observing the deflection on the meter 170.

Assuming further that the probe unit 134 which is fourth from the bottom becomes partially submerged, an intermediate d.c. voltage will appear on terminal four of the switch 160. Such a voltage will be greater than that occuring on the upper five lines 150, but less than that occurring on the lower three. With the switch 160 moved to the fourth position, the voltage appearing on line 164 will be amplified, and give rise to an intermediate reading on the meter 170. Since the amplifier 166 is linear, and since the magnitude of the signal on line 164 is directly dependent upon the percentage of the probe unit which is submerged, the reading on meter 170 will provide an indication as to the percentage of the particular probe unit (in this case, the fourth probe unit) 134 which is submerged. Consequently, a fine, high-resolution reading of the level can readily be otained, after the coarse digital reading has been made.

As shown in FIG. 11, the probe unit 200 also receives an a.c. signal from the multivibrator 214. The bias on amplifier 204 is normally set so as to provide a low level reading on the output line 210, thus keeping the alarm 212 inactive. In the event that the level of fluid in the tank rises so as to partially submerge the probe unit 200, the d.c. level on line 203 of the amplifier 204 will increase to the point where the output on line 210 assumes a positive state. This in turn will enable the alarm 212, thus indicating that an overflow condition is being reached in the tank. The operation of the probe unit 200 is similar to that of the probe units 134, and accordingly need not be repeated.

From the above it can be seen that I have provided a novel and improved liquid level gauging system which is simple in construction, reliable in operation, and which requires a minimum of maintenance and repair. A single probe unit by itself has been found to be especially useful in providing analog readings of levels; alternately a series of probe units can be employed, stacked vertically one above the other in order to provide both a digital coarse reading of a particular liquid level, as well as a much finer, higher resolution analog reading of the same. The device is thus seen to represent a distinct advance and improvement in the technology of liquid level gauging systems.

Variations and modifications are possible without departing from the spirit of the invention.

I claim:

1. A liquid level gauging apparatus for monitoring the height of liquid contained in a storage tank or the like, comprising in combination:
   a. an upright probe element adapted for immersion in said liquid,
   b. said probe element being constituted as an elongate circuit board having a conductive strip presenting a flat, exposed area running for a substantial length therealong and being substantially rigidly bonded thereto,
   c. an additional upright probe element adapted for immersion in said liquid in proximity to the first, said additional probe element being constituted as an elongate circuit board coextensive with the first and having a conductive strip presenting a flat, exposed area running for a substantial length therealong and being substantially rigidly bonded thereto,
   d. an elongate spacer rod disposed along said probe elements and constituting spacer means for maintaining the conductive strips of the probe elements in substantially coextensive spaced relation,
   e. the flat, exposed area of said conductive strips being spaced apart, facing one another, being substantially parallel to one another and generally coextensive with said spacer rod,
   f. mean mechanically connecting the probe elements to the spacer rod,
   g. means for applying a driving voltage to one of said conductive strips, and
   h. detector means connected to the other of said conductive strips to sense the potential assumed thereby and obtained from said driving voltage, said potential being a function of the degree of immersion of the probe elements in the liquid being gauged,
   i. said spacer rod and the probe elements forming a U-shaped channel with the legs of the channel being formed by the probe elements, respectively, and the connecting portion of the channel being formed by the rod, said spacer rod maintaining uniform spacing between the flat, exposed areas of said conductive strips, and the space between the flat, exposed areas of said strips being devoid of dielectric material other than the liquid being gauged, whereby no upwardly facing surfaces exist on which debris can become lodged,
   j. said channel being completely open at its mouth and providing unobstructed and free access of the liquid being gauged to said strips along their entire lengths.

2. The invention as defined in claim 1, and further including:
   a. mounting means for securing the rod and the elongate boards in a vertical position within a tank.

3. The invention as defined in claim 1, wherein:
   a. said voltage applying means comprises a free-running multivibrator.

4. The invention as defined in claim 1, wherein:
   a. said detector means comprises a rectifier and filter network,
   b. an amplifier connected with said network to receive signals therefrom, and
   c. an indicator connected to the output of said amplifier to be driven thereby.

5. The invention as defined in claim 4, and further including:
   a. variable biasing means connected with the input of the amplifier for enabling adjustment of the operating point thereof.

6. The invention as defined in claim 1, and further including:
   a. an additional conductive strip carried by said first circuit board and substantially coextensive with the first strip thereof, and
   b. means electrically connecting together the two strips of said first circuit board,
   c. said spacer rod engaging the first circuit board along a line extending between its two strips.

7. The invention as defined in claim 6, and further including:
   a. an additional conductive strip carried by said second circuit board and substantially coextensive with the first strip thereof, and
   b. means electrically connecting together the two strips of said second circuit board,
   c. said spacer rod engaging the second circuit board along a line extending between the conductive strips thereof, d. the additional strip of said first board facing the additional strip of said second board.

8. The invention as defined in claim 1, wherein:
a. said boards and spacer rod form two back-to-back channels having a cross sectional configuration similar to the letter H.

9. A gauging apparatus as in claim 1, and further including:
a. an additional probe unit as defined in claim 1,
b. said probe units being arranged in vertical alignment with one another,
c. means for electrically connecting the conductive strip of one probe element of the first probe unit to the conductive strip of one probe element of the additional probe unit,
d. said detector means also being connected to the conductive strip of the other probe element of the additional probe unit to sense the potential assumed thereby.

10. The invention as defined in claim 9, wherein:
a. said detector means includes a sealed rectifier network directly carried by one probe element of the first probe unit, and connected to the conductive strip thereof, for receiving a.c. signals therefrom and converting them to d.c. levels,
b. an additional sealed rectifier network directly carried by one probe element of the second probe unit, and connected to the conductive strip thereof, for receiving a.c. signals therefrom and converting them to d.c. levels, and
c. electrical leads extending respectively from the outputs of said networks for connection to amplifier and indicator circuitry located externally of the tank.

11. The invention as defined in claim 10, wherein:
a. said first sealed network comprises an epoxy casing carrying a rectifier and a resistor,
b. said casing having contact pins protruding therefrom for insertion into corresponding holes in the probe element carrying it, for establishing electrical contact with a conductive strip thereof.

12. The invention as defined in claim 10, wherein:
a. said spacer rod is constituted of aluminum and is connected to ground potential, and
b. means carried by said first sealed rectifier network and connected electrically with said aluminum rod, for establishing a point of ground potential in the network.

13. The invention as defined in claim 9, wherein:
a. the spacer rods of the first and second probe units are integral with one another.

14. The invention as defined in claim 9, wherein:
a. said electrical connection means comprises a jumper wire extending between the conductive strip of the said one probe element of the first probe unit and the conductive strip of the said one probe element of the additional probe unit.

15. The invention as defined in claim 9, wherein:
a. said electrical connecting means comprises a jumper wire extending between a pair of conductive strips of two adjacent probe units.

16. The invention as defined in claim 1, wherein:
a. said mechanical connecting means comprises rivets extending through the circuit boards and the spacer rod.

* * * * *

UNITED STATES PATENT OFFICE
CERTIFICATE OF CORRECTION

Patent No. 4,038,871            Dated August 2, 1977

Inventor(s) Harrison F. Edwards

It is certified that error appears in the above-identified patent and that said Letters Patent are hereby corrected as shown below:

Column 10, line 1, "area" should read --areas--.

Column 10, line 5, "mean" should read --means--.

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*